US008255371B2

(12) United States Patent
Giampaolo et al.

(10) Patent No.: US 8,255,371 B2
(45) Date of Patent: *Aug. 28, 2012

(54) METHODS AND APPARATUSES FOR DATA PROTECTION

(75) Inventors: Dominic Benjamin Giampaolo, Mountain View, CA (US); Michael Steven Mackovitch, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/608,981

(22) Filed: Oct. 29, 2009

(65) Prior Publication Data

US 2010/0049751 A1 Feb. 25, 2010

Related U.S. Application Data

(62) Division of application No. 11/149,709, filed on Jun. 10, 2005, now Pat. No. 7,613,743.

(51) Int. Cl.
*G06F 7/00* (2006.01)
*G06F 17/00* (2006.01)
(52) U.S. Cl. ........ 707/695; 707/703; 707/826; 713/160; 713/165; 713/193; 715/229
(58) Field of Classification Search .................. 707/640, 707/661, 674, 695, 703, 827, 826; 715/229; 713/151, 160, 165, 189, 193; 726/26, 27, 726/34; 709/204, 224
See application file for complete search history.

(56) References Cited

U.S. PATENT DOCUMENTS

| 5,452,445 A * | 9/1995 | Hallmark et al. ...... 707/999.002 |
| 5,481,699 A | 1/1996 | Saether |
| 5,701,480 A * | 12/1997 | Raz ................................ 718/101 |
| 5,781,912 A | 7/1998 | Demers et al. |
| 5,819,292 A | 10/1998 | Hitz et al. |
| 5,850,507 A | 12/1998 | Ngai et al. |
| 5,963,962 A | 10/1999 | Hitz et al. |
| 6,205,464 B1 | 3/2001 | Cobb et al. |
| 6,275,832 B1 | 8/2001 | Watts et al. |
| 6,295,548 B1 * | 9/2001 | Klein et al. .............. 707/999.01 |

(Continued)

OTHER PUBLICATIONS

P. Roy, S. Seshadri, A. Silberschatz, S. Sudarshan and S. Ashwin— "Garbage collection in object-oriented databases using transactional cyclic reference counting"—The VLDBJournal Springer-Verlag 1998, Journal the VLDB Journal—The International Journal on Very Large Data Bases archive vol. 7 Issue 3, Aug. 1998 (pp. 179-193;1-15).*

(Continued)

*Primary Examiner* — John E Breene
*Assistant Examiner* — Anh Ly
(74) *Attorney, Agent, or Firm* — Blakely, Sokoloff, Taylor & Zafman LLP

(57) ABSTRACT

Methods and apparatuses for data protection against corrupted write operations. In one embodiment, a technique of crash protection uses an atomically updated global transaction indicator to switch a set of data structures from one set of versions to another set. In one embodiment, the storage space for multiple versions of a data structure is allocated at the time the data structure is created on the storage device so that the multiple versions of the data structure can be kept close by. Between two consistent points, some data structures are modified to create new versions without changing the corresponding previous versions; and unmodified data structures are not copied. At a consistent point, the global transaction indicator is updated to indicate a set of consistent versions of the data structures, such as metadata of a file system.

18 Claims, 13 Drawing Sheets

U.S. PATENT DOCUMENTS

| | | | |
|---|---|---|---|
| 6,449,618 B1* | 9/2002 | Blott et al. | 707/999.101 |
| 6,470,342 B1 | 10/2002 | Gondi et al. | |
| 6,496,831 B1* | 12/2002 | Baulier et al. | 707/999.101 |
| 6,496,944 B1 | 12/2002 | Hsiao et al. | |
| 6,553,392 B1* | 4/2003 | Mosher, Jr. et al. | 707/999.2 |
| 6,571,259 B1 | 5/2003 | Zheng et al. | |
| 6,584,477 B1* | 6/2003 | Mosher, Jr. | 707/610 |
| 6,636,879 B1 | 10/2003 | Doucette et al. | |
| 6,721,739 B1 | 4/2004 | Mende, Jr. et al. | |
| 6,721,764 B2 | 4/2004 | Hitz et al. | |
| 6,732,124 B1 | 5/2004 | Koseki et al. | |
| 6,795,966 B1 | 9/2004 | Lim et al. | |
| 6,857,001 B2 | 2/2005 | Hitz et al. | |
| 7,010,553 B2 | 3/2006 | Chen et al. | |
| 7,043,485 B2 | 5/2006 | Manley et al. | |
| 7,076,508 B2* | 7/2006 | Bourbonnais et al. | 707/999.101 |
| 7,165,079 B1 | 1/2007 | Chen et al. | |
| 7,206,805 B1* | 4/2007 | McLaughlin, Jr. | 709/203 |
| 7,225,204 B2 | 5/2007 | Manley et al. | |
| 7,243,115 B2 | 7/2007 | Manley et al. | |
| 7,249,150 B1 | 7/2007 | Watanabe et al. | |
| 7,257,595 B2* | 8/2007 | Verma et al. | 707/683 |
| 7,305,396 B2* | 12/2007 | Schmidt et al. | 707/999.101 |
| 7,313,720 B1 | 12/2007 | Eng et al. | |
| 7,340,486 B1 | 3/2008 | Chapman | |
| 7,363,537 B1 | 4/2008 | Svarcas et al. | |
| 7,373,438 B1 | 5/2008 | DeBergalis et al. | |
| 7,457,982 B2 | 11/2008 | Rajan | |
| 7,739,237 B2 | 6/2010 | Holenstein et al. | |
| 7,814,057 B2* | 10/2010 | Kathuria et al. | 707/646 |
| 2001/0044807 A1 | 11/2001 | Kleiman et al. | |
| 2002/0049853 A1 | 4/2002 | Chu et al. | |
| 2002/0103815 A1 | 8/2002 | Duvillier et al. | |
| 2002/0103819 A1 | 8/2002 | Duvillier et al. | |
| 2002/0184239 A1 | 12/2002 | Mosher et al. | |
| 2003/0050930 A1 | 3/2003 | Mosher et al. | |
| 2003/0058277 A1 | 3/2003 | Bowman-Amuah | |
| 2003/0112151 A1 | 6/2003 | Chauvin et al. | |
| 2003/0159007 A1 | 8/2003 | Sawdon et al. | |
| 2003/0182312 A1 | 9/2003 | Chen et al. | |
| 2003/0182313 A1 | 9/2003 | Federwisch et al. | |
| 2003/0182322 A1 | 9/2003 | Manley et al. | |
| 2003/0182325 A1 | 9/2003 | Manley et al. | |
| 2003/0182326 A1 | 9/2003 | Patterson | |
| 2003/0182330 A1 | 9/2003 | Manley et al. | |
| 2003/0229656 A1 | 12/2003 | Hitz et al. | |
| 2004/0030703 A1* | 2/2004 | Bourbonnais et al. | 707/100 |
| 2004/0054748 A1 | 3/2004 | Ackaouy et al. | |
| 2004/0054777 A1* | 3/2004 | Ackaouy et al. | 709/225 |
| 2004/0068501 A1 | 4/2004 | McGoveran | |
| 2004/0107225 A1 | 6/2004 | Rudoff | |
| 2004/0133590 A1* | 7/2004 | Henderson et al. | 707/102 |
| 2004/0177099 A1 | 9/2004 | Ganesh et al. | |
| 2004/0186858 A1 | 9/2004 | McGovern et al. | |
| 2004/0193552 A1 | 9/2004 | Ikenaga et al. | |
| 2004/0225736 A1* | 11/2004 | Raphael | 709/226 |
| 2004/0260673 A1* | 12/2004 | Hitz et al. | 707/1 |
| 2005/0120059 A1 | 6/2005 | Verma et al. | |
| 2005/0125430 A1 | 6/2005 | Souder et al. | |
| 2005/0144202 A1 | 6/2005 | Chen | |
| 2005/0149525 A1* | 7/2005 | Verma et al. | 707/8 |
| 2005/0182799 A1 | 8/2005 | Hitz et al. | |
| 2006/0036660 A1 | 2/2006 | Lynn | |
| 2006/0085426 A1 | 4/2006 | Verma et al. | |
| 2006/0112151 A1 | 5/2006 | Manley et al. | |
| 2006/0179261 A1 | 8/2006 | Rajan | |
| 2006/0184587 A1 | 8/2006 | Federwisch et al. | |
| 2006/0200507 A1 | 9/2006 | Holensteing et al. | |
| 2006/0218206 A1* | 9/2006 | Bourbonnais et al. | 707/202 |
| 2007/0255678 A1 | 11/2007 | Majumdar | |
| 2007/0276878 A1 | 11/2007 | Zheng et al. | |
| 2008/0282244 A1 | 11/2008 | Wu et al. | |
| 2011/0276611 A1* | 11/2011 | Verma et al. | 707/826 |

OTHER PUBLICATIONS

Z.Wu K. Moody and J. Bacon and R. J. Stroud—"Data Consistency in a Distributed Persistent Object System"—Proceedings of the 28th Annual Hawaii International Conference on System Sciences—1995—(pp. 635-640).*

Dave Hitz, et al., "File System Design for an NFS File Server Appliance", TR 3002, www.netapp.com/tech-library/3002.html, downloaded on Sep. 28, 2004.

Douglas S. Santry, et al., "Deciding when to Forget in the Elephant Filing System", ACM, pp. 110-123, 1999.

Jun-Lin Lin, et al., "A Survey of Distributed Database Checkpointing", Distributed and Parallel Database, 5, pp. 289-319, 1997.

Kee S. Ong, "Synapse Approach to Data Recovery", Symposium on Principles of Database Systems, Proceedings of the $3^{rd}$ ACM SIGACT-SIGMOD Symposium on Principles of Database Systems, Session 3, pp. 79-85, 1984.

Chuang-Hue Moh, "Snapshots in a Distributed Persistent Object Storage System", Citeseer Massachusetts Institute of Technology, pp. 1-62, 2003.

* cited by examiner

METHODS AND APPARATUSES FOR DATA PROTECTION

CROSS-REFERENCE TO RELATED APPLICATION

This application is a divisional of U.S. patent application Ser. No. 11/149,709, filed Jun. 10, 2005 now U.S. Pat. No. 7,613,743.

TECHNOLOGY FIELD

At least some embodiments of the present invention relate to protection of data on a non-volatile storage device against corrupted write operations which may cause data inconsistency, such as file system inconsistency.

BACKGROUND

When a computer system crashes during updating a data structure on a non-volatile storage device (e.g., a disk), the data structure may become corrupted. A data structure typically contains inter-related portions of data. When the data structure is only partially updated (e.g., because a crash prevented the completion of an update), the inter-relation among portions of the data may become invalid, leaving the data structure in a state of inconsistency.

For example, a file system typically contains metadata, which organizes user data in a storage unit. A file system typically includes metadata to describe the location, the size, and other information about files in the storage unit. A file system may also maintain metadata to identify the free space on the storage unit which can be allocated for the storage of additional data. If the file system metadata is in an inconsistent state, the system may crash or corrupt user data during operation.

An operating system is typically programmed to update and access the file system metadata in a consistent fashion. The file system metadata may be cached in the volatile memory of the computer system for fast access. To cleanly shutdown a file system, an operating system typically puts the metadata of the file system on a non-volatile storage device in a consistent state by completing any pending write operations and flushing the data from cache into the non-volatile storage device.

However, if a computer crashes, unexpectedly reboots or loses power, the file system metadata on the non-volatile disk storage may suffer corruption if the metadata is only partially updated. Thus, after an unclean shutdown, an operating system typically checks the file system metadata for consistency to validate the file system.

On large file systems checking the file system metadata for consistency can take a very long time. Further, the repair process may not always be able to fix all possible types of corruption. After a crash, a recovery process may need user intervention to bring the file system metadata into a consistent state.

Data consistency is also of concern to databases users. Traditionally, databases use transaction processing techniques to maintain database consistency in the presence of a system crash. One transaction processing technique is to group one or more write operations into a transaction so that the data system is consistent before and after the transaction. The operations for a transaction is logged but not performed before a request to commit the transaction is received. A transaction commit operation updates the database according to the log. The log is typically in a form such that, after a partial commitment of the transaction, the database system can roll back to the state before the transaction or replay the log to reach the state after the transaction.

Before and after the execution of the transaction commit operation, the database is in a consistent state; during the execution of the transaction commit operation, the database is typically in an inconsistent state. If a crash happens during the execution of the transaction commit operation, the log can be used to roll back to the consistent before-transaction state or replayed to reach the consistent after-transaction state.

In a journaling file system, a complete set of modifications made to the on-disk structure of the file system is organized as a transaction. In a way similar to the database operations, a journaling file system maintains a log of the operations to perform one or more transactions. After a crash, uncompleted transactions can be replayed according to the log to bring the system to a consistent point.

Certain copy-on-write file systems maintain multiple versions of files. For example, a Write Anywhere File Layout (WAFL) file system has algorithms and data structures to implement snapshots, which are read-only clones of the active file system. WAFL stores metadata in files, including the mode file which contains the modes for the file system, the block-map file (e.g., in the form of a bit map or an extent map) which identifies free blocks, and the inode-map file which identifiers free modes. An inode typically includes information of a file regarding user and group ownership, access mode (e.g., read, write, execute permissions) and type, locking information, the number of links to the file, the size of the file, access and modification times, the addresses of the blocks of the file, etc. WAFL keeps metadata in files so that meta-data blocks can be written anywhere on disk.

A WAFL file system is in the form of a tree of blocks. At the root of the tree is the root inode that describes the mode file. The inode file contains the inodes that describe the rest of the files in the file system, including the block-map and inode-map files. The leaves of the tree are the data blocks of the files.

WAFL creates a special snapshot periodically (e.g., every few seconds) to obtain a completely self-consistent image of the entire file system and mark a consistent point. Between consistency points, WAFL write data only to blocks that are not in use, so the tree of blocks representing the most recent consistency point remains completely unchanged. WAFL uses non-volatile RAM (NVRAM) (e.g., special memory with batteries that allow it to store data even when system power is off) to keep a log of write requests processed since the last consistency point. After an unclean shutdown, WAFL replays any requests in the log to prevent data loss.

SUMMARY OF THE DESCRIPTION

Methods and apparatuses for data protection against corrupted write operations are described here. Some of the embodiments of the present invention are summarized in this section.

In one embodiment of the present invention, a technique of crash protection uses an atomically updated global transaction indicator to switch a set of data structures from one set of versions to another set. In one embodiment, the storage space for multiple versions of a data structure is allocated at the time the data structure is created on the storage device so that the multiple versions of the data structure can be kept close by. Between two consistent points, some data structures are modified to create new versions without changing the corresponding previous versions; and unmodified data structures are not copied. At a consistent point, the global transaction indicator is updated to indicate a set of consistent versions of the data structures, such as metadata of a file system.

This metadata may include (a) a file which identifies free and/or allocated blocks on the storage medium (e.g., in the form of a bit map or an extent (range) map; (b) data describing the structure of the file directories; (c) data describing each file (e.g., the addresses of the blocks of the storage medium which contain the data of the file; user and group ownership of the file; access mode, such as read, write, and execute permissions; the size of the file; access and modification times; etc.).

In one aspect, a method for data protection includes: atomically recording a first global transaction identifier to indicate a first consistent point for a plurality of first versions of a plurality of data structures; creating one or more second versions of a portion of the plurality of data structures without destroying the plurality of first versions of the plurality of data structures; and atomically recording a second global transaction identifier to indicate a second consistent point for the one or more second versions of the portion of the plurality of data structures and a portion of the plurality of first versions of the plurality of data structures. In one embodiment, the data structures include metadata of a file system for at least one machine readable storage device; and a portion of the data structure corresponding to the portion of the plurality of first versions is not changed between the first and second consistent points. In one embodiment, the plurality of first versions are tagged with one or more first transaction identifiers to indicate that the plurality of first versions are created no later than the first global transaction identifier; and the one or more second versions are tagged with one or more second transaction identifiers to indicate that the one or more second versions are created no earlier than the first global transaction identifier and no later than the second global transaction identifier.

In one embodiment of the aspect, the method further includes: recording information identifying the portion of the plurality of data structures before creating the one or more second versions; and searching the portion of the plurality of data structures according to the information for invalid versions after a crash.

In another embodiment of the aspect, the method further includes: determining one or more third transaction identifiers after a crash, the one or more third transaction identifiers including the one or more second transaction identifiers; and recording information specifying the one or more third transaction identifiers to indicate that versions tagged with the one or more third transaction identifiers are invalid. In one example, a background process is used to search for an invalid version that is tagged with one of the one or more third transaction identifiers.

In another aspect, a method for data protection includes: allocating a storage space on a non-volatile storage for a plurality of copies of a data structure to create the data structure on the non-volatile storage; and storing a plurality of different versions of the data structure in the storage space. In one example, the storage space is localized on the non-volatile storage; and the allocating occurs before any portion of the storage space is needed.

In one embodiment, the plurality of versions of the data structure are tagged with a plurality of transaction identifiers respectively to indicate a time sequence of the plurality of versions. Information indicating transactions successfully committed on the non-volatile storage is stored (e.g., on the non-volatile storage).

In one embodiment, the information includes a first transaction identifier indicating a set of identifiers used to tag transactions prior to the first transaction identifier. In one embodiment, the information further includes one or more ranges of transaction identifiers to represent unsuccessfully committed transactions.

In one embodiment, the data structure is a metadata of a file system on the non-volatile storage, such as inode, block allocation map, inode-map, etc.

In one aspect of an embodiment of the present invention, a method for processing data, includes: maintaining a first version of portions of a file and a corresponding first transaction ID; storing a second version of portions of the file and a corresponding second transaction ID; and storing, through an atomic recording process, a global transaction ID to mark a consistent point in relation with the first and second transaction IDs. In one example, a later recorded version has a transaction ID higher than a corresponding earlier recorded version; and a version with a transaction ID closest to, but not larger than, the global transaction ID is a part of the consistent point. In one example, the global transaction ID marks the consistent point for a plurality of files based on a relation between the global transaction ID and transaction IDs of versions of portions of the plurality of files. In one example, the file, the first and second transaction ID and the global transaction ID are stored in one non-volatile storage device.

In one aspect of an embodiment of the present invention, a method for processing data, includes: recording a plurality of versions of a plurality of data structures with transaction identifiers for corresponding ones of the versions; and storing atomically a global transaction identifier to mark a consistent point based on a relation between the global transaction identifier and the transaction identifiers. In one example, the global transaction identifier indicates that the consistent point includes versions of data with transaction identifiers closest to but not larger than the global transaction identifier. In one example, the plurality of versions of the plurality of data structures are recorded on a non-volatile storage device; the global transaction identifier is stored atomically onto the non-volatile storage device. In one example, at least one of the plurality of data structures includes a plurality of different versions.

In one aspect of an embodiment of the present invention, a method for processing data, includes: after a crash, retrieving a global transaction identifier; and storing information indicating one or more transaction identifiers as invalid according to the global transaction ID. In one example, the method further includes: receiving a request to access a first data; and determining whether or not a version of the first data is invalid based one checking a transaction identifier of the version of the first data against at least the information indicating the one or more transaction identifiers as invalid. In one example, the global transaction identifier is retrieved from a storage device where a plurality of versions of the first data are stored; and the information indicating the one or more transaction identifiers as invalid is stored onto the storage device. In one example, the global transaction identifier is updated before a transaction identifier is provided to record a new version of data onto the storage device.

In one aspect of an embodiment of the present invention, a method for processing data, includes: after a crash, retrieving information indicating one or more locations in a storage device; retrieving a global transaction ID; and searching the one or more locations in the storage device according to the information for one or more invalid versions of data based on checking whether or not a relation between a transaction identifier of a version of data and the global transaction ID is broken. In one example, the method further includes: deleting one or more versions of data with invalid transaction identifiers. In one example, a transaction identifier larger than the global transaction ID is invalid. In one example, the information and the global transaction ID are retrieved from the storage device; a file system records the information indicating locations of new versions of data into the storage device before recording corresponding new versions; and the file system updates atomically the global transaction ID on the storage device upon completion of recording the corresponding new versions.

In one aspect of an embodiment, a non-volatile storage device, includes: a first portion storing a plurality of versions of a plurality of data structures, each version having a transaction identifier; and a second portion coupled with the first portion, the second portion storing a global transaction identifier to mark a consistent point based on a relation between the global transaction identifier and the transaction identifiers. In one example, the device further includes: a third portion storing information indicating at least one location in the first portion where at least one version of one data structure is recorded after the consistent point. In another example, the device further includes: a third portion storing information indicating at least one invalid transaction identifier. In one example, different versions of each of the data structures are positioned close to each other in the first portion.

The present invention includes methods and apparatuses which perform these methods, including data processing systems which perform these methods, and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
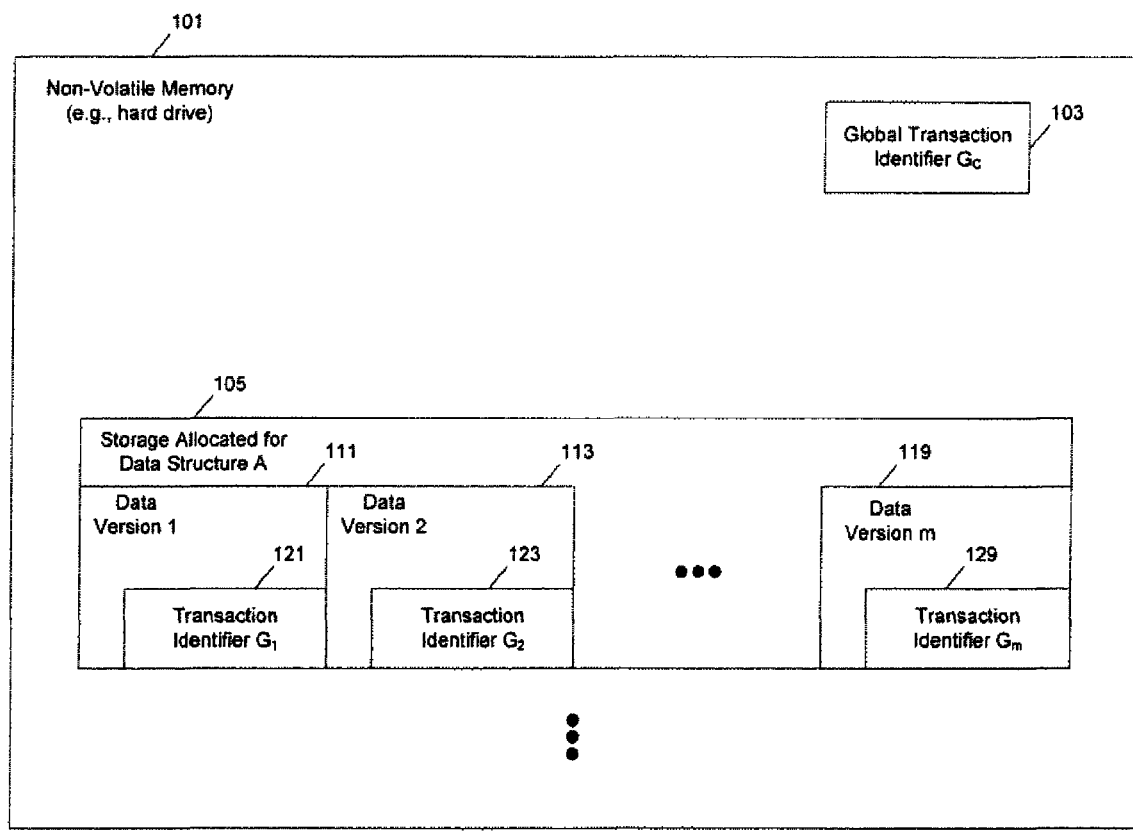
FIGS. 1-4 illustrate methods to use an atomic update of a global transaction identifier to mark a consistent set of versions of data structures according to embodiments of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

At least one embodiment of the present invention provides a technique of crash protection which uses an atomically updated global transaction indicator to switch a set of data structures from one set of versions to another set.

In one embodiment, a data structure maintains multiple versions of the data. Data consistency is maintained through switching from one consistent set of versions of data structures to another set. The switching is realized through the atomic update of the global transaction indicator. For example, an atomically updated global transaction ID can be used to switch to a new consistent set of versions of the data structures.

The data structure may be one or more of various different types of data. For example, the data structure may be the file system metadata maintained by a computer's operating system such as (a) a data structure which identifies free and/or allocated storage blocks on one or more storage media (e.g., a block allocation bit map or an extent (range) map which indicates free blocks), or (b) data describing the structure of the file directories (e.g., directories and subdirectories which are within the directories and hierarchically higher subdirectories), or (c) data (e.g., file system metadata) describing each user file (such as the addresses of the blocks of the storage medium which contain the data of the user file and/or user and group ownership of the user file and/or access mode/permissions (e.g., read or write or execute) and/or the size of the user file and/or the type of file and/or the name of the user file and/or user access and creation and modification times, and/or other information contained in an inode file for a user file, etc.) The data structure may be, in certain embodiments, the actual user files (rather than file system metadata about those user files) or user metadata about user files (e.g., user supplied metadata about user files such as title, or summary or other information). The data structure can take a variety of different forms, including list forms or hash table forms or tree forms.

In one embodiment, the file system allows the concurrent access from multiple applications. The multiple applications may be running concurrently under the control of a multitasking operating system. The multiple applications may perform concurrent write operations on different files in the file system. When a file is opened for write operations by one application process, this file may or may not be locked for write operations with respect to other application processes. In one embodiment of the present invention, when the applications make system calls to perform write operations, the system automatically uses transaction ID to tag different versions of data. The file system records a global transaction ID to mark (e.g., automatically and periodically) a consistent point for consistent versions of data that have already been flushed into the non-volatile storage. Thus, the operations of the global transaction ID and the transaction IDs for different versions of data are encapsulated from the applications. Alternatively, the file system may expose some or all of the operations related to the transaction IDs for different versions and the global transaction ID to applications through a set of application program interfaces (APIs).

In one embodiment of the present invention, different transaction IDs are provided to tag different versions of the data structures created through write operations. A data structure can have multiple versions associated with multiple transaction IDs respectively. For example, a bit map file of the allocation of blocks of a storage medium would have, for the same block, multiple versions of data for the same block, each version with its different, respective transaction ID.

In one embodiment, comparison between a transaction ID of a version of the data structure and the global transaction ID can be used to determine the validity of the corresponding version of the data structure. In one embodiment, the atomically updated global transaction ID and transaction IDs for write operations between atomic updates of the global transaction ID are generated in a way such that whether or not a transaction ID of a version is issued after the atomic update of the global transaction ID can be determined from the global transaction ID and the transaction ID of the version.

For example, in one embodiment, transaction IDs for write operations, which are performed after an atomic update of the global transaction ID, are larger than the global transaction ID; and the global transaction ID is atomically updated to a number larger than previously transaction IDs used for write operations. Thus, if a version of a data structure has a transaction ID that is larger than the global transaction ID, the corresponding version of the data structure is written (create or updated) after the consistent point indicated by the global transaction ID. If a version of a data structure has a transaction ID that is smaller than the global transaction ID, the version of the data structure is written before the consistent point indicated by the global transaction ID.

The data structures including a version that is created/updated after the consistent point indicated by the global transaction ID may be in an inconsistent state. The set of latest versions of the data structures that are written before the consistent point are in a consistent state, as indicated by the global transaction ID.

In one embodiment of the present invention, to access the latest consistent set of versions of the data structures, a system locates a version of the data structure with the most recent valid transaction ID (e.g., smaller than and closest to the global transaction ID). Versions of data structure which have invalid transaction IDs (e.g., larger than the global transaction ID after a crash) are ignored.

In one embodiment of the present invention, a data structure maintains at least the latest version written before the consistent point when the data structure is updated to create the next version. Thus, the set of data structures has at least one set of versions that represent a consistent point. When the new updates reach a consistent point, an atomic update to the global transaction ID switches the set of data structures to the next consistent point.

For example, after flushing any on-disk buffer, writing the global transaction ID block and again flushing any on-disk buffers, a new consistent point is reached. When the data blocks of a transaction have been written to the disk to bring the file system to a consistent point, the global transaction ID can be updated on disk to indicate the switching from the previous set of consistent versions to the current set of consistent versions. A transaction is complete when the global transaction ID is safely updated on the non-volatile storage device (e.g., after the non-volatile storage device acknowledges that it has completed the flushing operation in response to the method's flushing command to the non-volatile storage device).

In one embodiment, the atomic update of the global transaction ID indicates a consistent set of versions of the set of data structures. Between the atomic updates of the global transaction ID, write operations on the non-volatile storage device can create new inconsistent versions of data structures. However, even when inconsistent updates are made to the set of data structure, the set of consistent versions of the set of data structures (that were previously stored) is preserved and is accessible according to the global transaction ID. Thus, the file system always has a consistent version secured on the disk.

In one embodiment of the present invention, the atomically updated global transaction ID is used to indicate the set of valid transaction ID. For example, if a transaction ID of a version of a data structure is larger than the global transaction ID after a crash, the corresponding version of the data structure is considered invalid, since it corresponds to an incomplete update on the non-volatile storage device (e.g., a crash occurred in the middle of a write transaction to the non-volatile storage medium so only some of the data in that transaction was saved).

In one embodiment of the present invention, the global transaction ID can have a number of versions corresponding to a number of consistent points in time. A version of the global transaction ID marks a consistent set of versions updated prior to the version of the global transaction ID. Thus, a number of previous consistent points are accessible.

In one embodiment of the present invention, multiple versions of a data structure are kept close by (e.g., in the same track or on adjacent tracks of a non-volatile storage medium such as a magnetic hard drive) to prevent storage fragmentation, reducing the disk seek penalty for fetching blocks of data which are not close by. In one embodiment of the present invention, the storage space for the multiple versions of a data structure is allocated at the time the data structure is created on the storage device (before any portion of the storage is needed or actually used and before any version of the data structure is stored on the storage device) so that the multiple versions of the data structure can be kept close by. In one embodiment, the transaction IDs for the multiple versions indicate the time sequence of the versions (e.g., the version with a larger transaction ID is generated later in time than the version with a smaller transaction ID). In one embodiment, when the pre-allocated space for multiple versions of a data structure are fully populated with different versions of data, the oldest version can be overwritten to store data for the latest version.

In one embodiment of the present invention, the global transaction ID is used to globally mark the consistent point for a set of data structures having multiple versions maintained individually for the data structures. Between two atomic updates of the global transactions, some of the data structures may be updated to create new versions, while the remaining of the data structures may not have a new version. Generally, the global transaction ID marks a consistent combination of versions of the data structures. Typically, two consistent points share the same versions of some data structures without modification or copying and have different versions for other data structures that are modified between the two consistent points.

If a crash occurs while a write transaction is in progress, there may be partially updated data structures on the non-volatile storage (e.g., disk). The partially updated versions of the data structures are invalid. In one embodiment of the present invention, write operations, which are performed after an atomic update of the global transaction ID, create new versions that are tagged with one or more transaction IDs greater than the global transaction ID (e.g., through copy-on-write). The latest version less than or equal to the global transaction ID is maintained and not changed. After the crash, comparing the global transaction ID and transaction IDs of the new versions can determine if the corresponding version is invalid.

In one embodiment of the present invention, a record of the list of data structures to be modified is secured on a non-volatile storage device before modifications to the data structures are made to create new versions of the data structures. In the recovery process, the data structures on the list are checked for invalid versions through comparing the transaction IDs of versions of the data structures on the list and the global transaction ID. After the invalid versions (e.g., the versions created after the atomic update of the global transaction ID) are cleaned, the data system returns to the consistent point marked by the global transaction ID.

In one embodiment of the present invention, the recovery process is performed on demand (or in background). When a data structure is accessed, the versions of the data structure are checked to determine the latest valid version. Thus, it is not necessary to eliminate the invalid versions before using the data system.

In one embodiment, the global transaction ID is updated atomically to mark a consistent point after the recovery process is complete.

In one embodiment of the present invention, a non-volatile record of a range of invalid transaction IDs is determined in the recovery process. For example, typically, there is a maximum number of transactions allowed between two consistent points marked by two atomic writes of the global transaction ID. Thus, the range of the transaction IDs determined from the global transaction ID on disk and the maximum increment can be recorded as invalid transaction IDs after a crash has occurred. The range of invalid transaction IDs covers the maximum number of in-flight transactions. The range of invalid transaction IDs will be excluded from being used in subsequent transactions.

In one embodiment of the present invention, the transaction ID of a version of an accessed data structure is validated against the range of invalid transaction IDs. Thus, it is not necessary to search and eliminate the invalid versions before the use of the data system after a crash.

In one embodiment of the present invention, the data for a data structure is written only once to create a new version. In a journaling approach, the data structure is effectively written twice, once as log and once as an update to the data structure. Further, journaling has the limitation of contention and serialization imposed by a single journal.

In one embodiment of the present invention, multiple versions are located close to each other to prevent fragmentation. In a WAFL approach, the data structure is spread around the disk, leading to significant fragmentation. In general, atomically updating a global transaction identifier to make a checkpoint is faster than making a snapshot of the WAFL file system.

FIGS. 1-4 illustrate methods to use an atomic update of a global transaction identifier to mark a consistent set of versions of data structures according to embodiments of the present invention.

In FIG. 1, a non-volatile memory (101) is used to store a plurality of data structures. For example, a storage (105) is allocated for a data structure when the data structure is created on the non-volatile memory (101). The storage (105) can be used to store a plurality of versions (111, 113, . . . , 119) of the data structure. The storage (105) is allocated at the time the data structure is created so that the plurality of versions (111, 1113, . . . , 119) of the data structure can be stored physically close to each other (e.g., within the same track or on adjacent tracks on the same physical recording medium).

In FIG. 1, data versions (111, 113, . . . , 119) are tagged with corresponding transaction identifiers (121, 123, . . . , 129) respectively. Typically, when a transaction with a given transaction identifier is made to create the data structure, a version of the data structure tagged with the given transaction identifier is created in one slot of the storage (105). When another transaction with a different transaction identifier is made to update the data structure, a new version of the data structure tagged with the corresponding transaction identifier is created in the storage (105) at a different slot of the storage (105). Thus, a previous version of the data structure remains unchanged while a new version of the data structure is created.

When the storage (105) is fully populated with different versions, a new version can overwrite the oldest version which may be identified by its transaction identifier. In one embodiment, at least one version closest to and earlier than the global transaction identifier (103) is not overwritten between two atomic updates of the global transaction identifier. Alternatively, only one new version is created between two consistent points.

In one embodiment of the present invention, a new version may be created for every write operation performed on the data structure, or for every new transaction performed on the data structure, or for one or more transactions performed between two checkpoints.

In one embodiment, the transaction identifiers (121, 123, . . . , 129) are different from each other so that a time sequence of the versions can be determined from the set of transaction identifiers. For example, the transaction identifiers can be identification numbers that increase in time. Thus, a version with a smaller transaction identification number is older than a version with a larger transaction identification number.

In general, a transaction identifier can be in various different forms, such as an integer number, a string of characters, etc. The transaction identifier can also be a timestamp. It is understood that adjusting the system clock backward may cause errors when a timestamp smaller than previously used timestamps is used as a transaction identifier. In such a case, alternative compatible transaction identifiers can be used until the backward adjusted system clock runs pass the largest timestamp previously used. For example, a slow "clock" can be started from the previously used largest timestamp to generate pseudo-timestamps as transaction identifiers. Pseudo-timestamps can be generated according to the slow "clock" until the system clock catches the slow "clock". The speed of the slow "clock" relative to the system clock can be selected to adjust the temporary time period in which the pseudo-timestamps are used.

In one embodiment of the present invention, different transactions between two checkpoints use different transaction identifiers; alternatively, the transactions between two checkpoints can share one same transaction identifier.

In one embodiment of the present invention, different data structures can have different numbers of versions or the same number of versions. Typically, the number of versions maintained for a data structure is determined at the time the data structure is created and the storage is allocated. Thus, different versions of the data structure are close to each other in the non-volatile memory, such as a disk drive, to prevent fragmentation.

Alternatively, storage for different versions can be allocated dynamically when the new version is created. For example, a linked structure can be used to dynamically add or remove a new version. However, dynamic allocation may cause storage fragmentation.

In the non-volatile memory (101), inconsistency may present in a number of ways. For example, a transaction on a data structure may involve updating the data structure multiple times to modify different portions of the data structure.

A partially completed transaction on the data structure may leave the data structure in an inconsistent state. For example, a partially completed write operation may partially modify the data structure to cause inconsistency.

Further, a transaction may involve updating multiple data structures. A partial transaction that completely updates some of the data structures but not all of the data structures may leave the multiple data structures in an inconsistent state.

In one embodiment of the present invention, a checkpoint is marked through an atomic update to the global transaction identifier (103). When the data on the non-volatile memory reaches a consistent point (e.g., after completing one or more transactions and flushing cached data into the non-volatile memory), global transaction identifier (103) is atomically updated to indicate a consistent set of versions of the data by writing (storing) the new global transaction identifier and then flushing the non-volatile storage device's cache to ensure that the new global transaction identifier has been stored.

For example, a global transaction identifier (103) can be updated to a transaction identification number that is greater than the transaction identification numbers of completed transactions so that the set of versions of the data structures on the non-volatile memory (101) that are closest to but no greater than the global transaction identifier is the consistent set of versions indicated by the global transaction identifier (103).

In one embodiment of the present invention, when new versions of data structures are created, at least one consistent set of versions indicated by the global transaction identifier (103) is unchanged on the non-volatile memory (101). When a new consistent set of versions is on the non-volatile memory (101), the global transaction identifier (103) is updated atomically to switch to the new consistent set.

In one embodiment of the present invention, the global transaction identifier also has a number of different versions. Thus, a set of previous consistent points can be accessed according to previous versions of the global transaction identifier.

In one embodiment of the present invention, different data structures on the non-volatile memory (101) are on a same physical device (e.g., a hard drive, a flash memory, etc.). Alternatively, different data structures on the non-volatile memory (101) can be on a different set of physical devices (e.g., a set of hard drives, a set of networked storage devices, NVRAM such as battery powered RAM, a combination of these, etc.).

In one embodiment of the present invention, during normal operation, inconsistent versions (e.g., having a transaction identification number larger than the transaction identification number on the non-volatile memory but smaller than any active transaction identification numbers) can also be accessed for read and write (e.g., to complete transactions). After a crash, the inconsistent versions become invalid versions, which are discarded at a proper time based on the recovery process.

Figure 2:
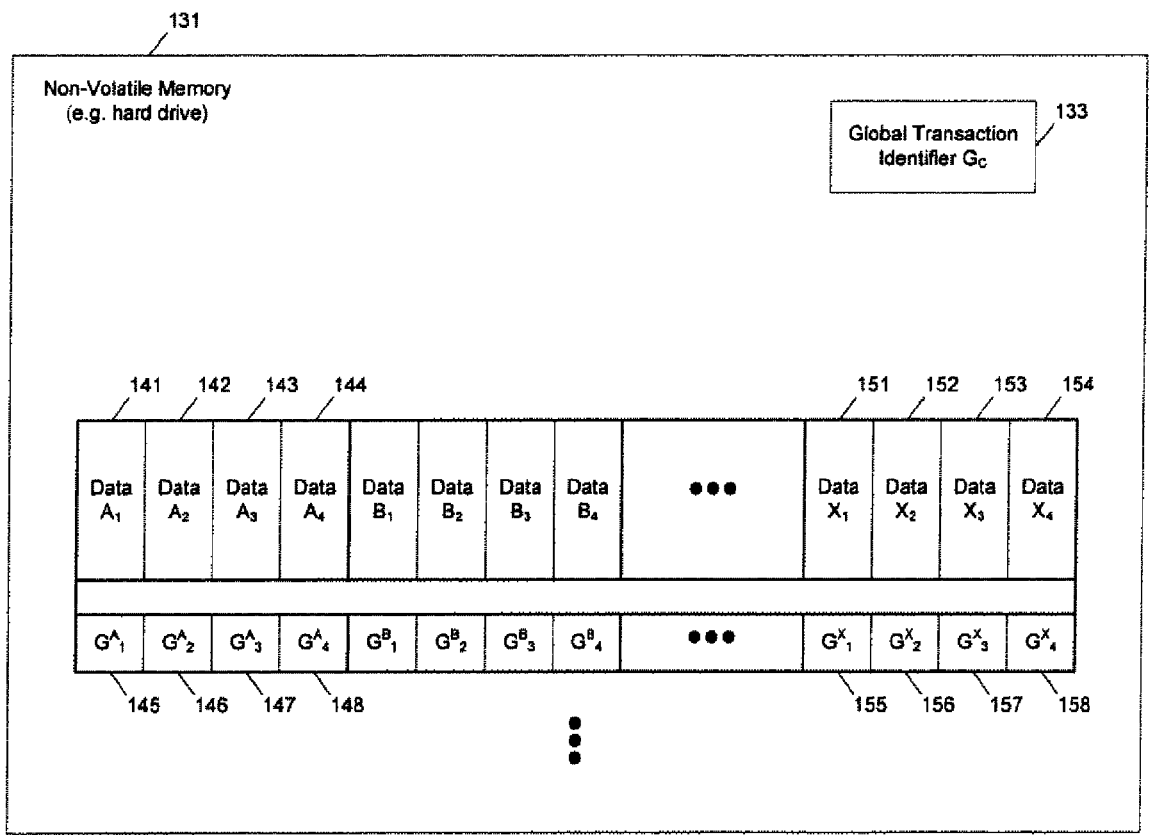

FIG. 2 illustrates a scheme to store different versions of data. In FIG. 2, a data structure on a non-volatile memory (131) is segmented into a number of portions. A portion of the data structure can have multiple versions (e.g., 141-144 or 151-154) tagged with different transaction identifiers (e.g., 145-148 or 155-158) respectively. Thus, different versions of a portion of the data structure are close to each other on the non-volatile memory (131). It will be understood that the portions of the data structure may, in at least certain embodiments, be portion of a file such as an inode file or other files of a file system for a data processing device (e.g., files containing file system metadata).

In FIG. 2, modifications to different portions of the data structure can advance the versions of different portions differently. Different portions of the data structure may not synchronously progress into new versions at a consistent point. The position of the new version of one portion of the data structure may not be used to determine the position of the new version of another portion at a consistent point, since different portions are independently modified.

For example, at a first consistent point marked according to global transaction identifier (133), a set of consistent versions of portions of the data structure includes the versions at the first slot (e.g., versions 141 and 151). Between the first consistent point and a second consistent point, data portion X is modified to generate the new version (152) without changing the old version (151); and data portion A is not modified. Thus, at the second consistent point, a set of consistent versions includes versions at different slots (e.g., versions 141 and 152). The portion of the data structure that is modified is copied to create the new version. The unmodified portion of the data structure is not copied. Thus, segmenting a large data structure into portions with individual version control can reduce the amount of data to be copied to create a new version and improve efficiency. On the other side, grouping small data structures together can reduce the space used to individually tag the different versions with transaction identifiers.

Figure 3:
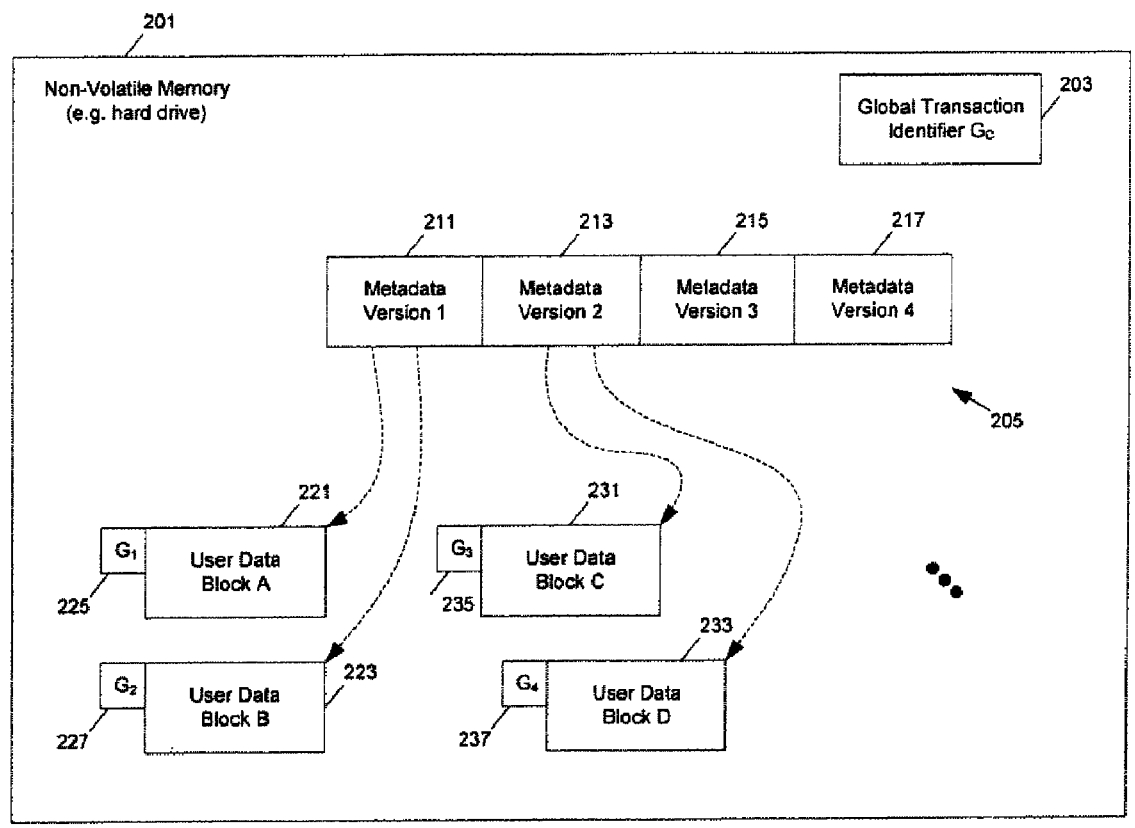
Figure 4:
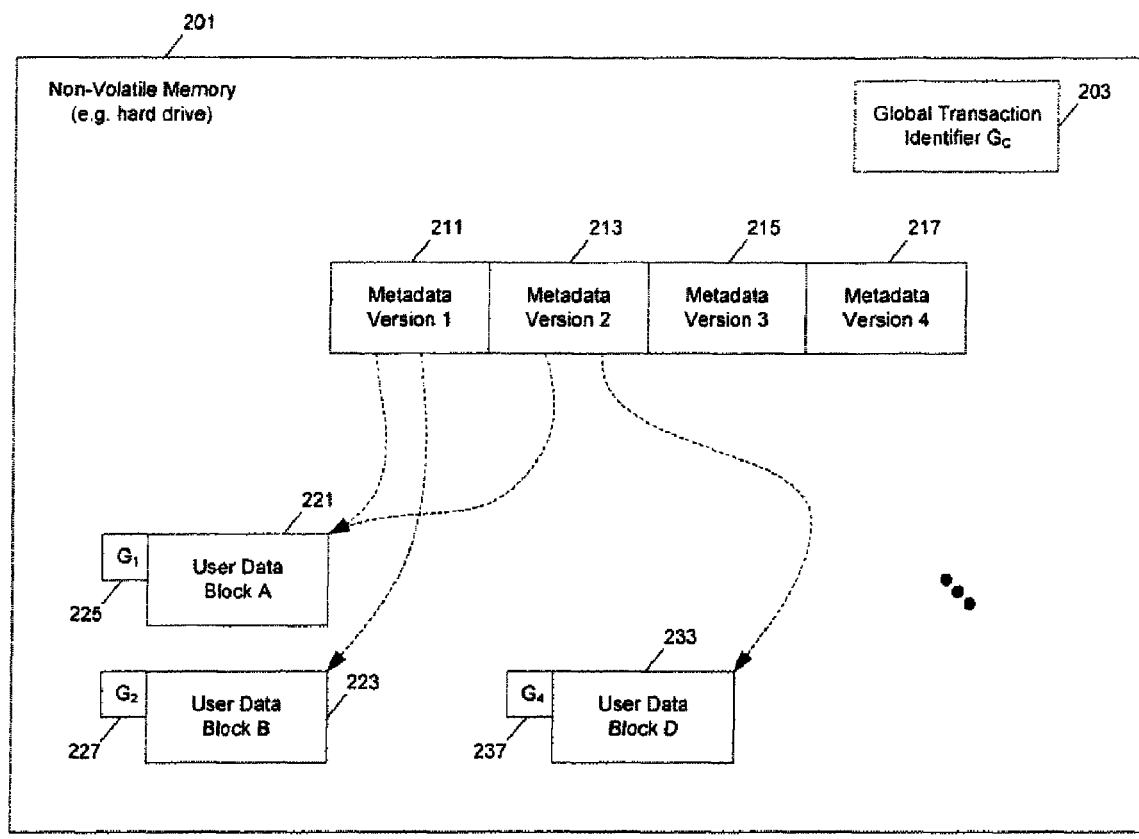

FIG. 3 illustrates a file system according to one embodiment of the present invention. In FIG. 3, the file system is on a non-volatile memory (e.g., hard drive) (201). The metadata has localized multiple versions. For example, in FIG. 3, the metadata (205) may include an inode for a file, which has user data blocks (e.g., 221, 223, 231, 233).

For example, at one consistent point, the global transaction identifier (203) may indicate that the data version (211) is the latest valid version, which points to user data blocks (221 and 223) for the file. When the filed is updated, new blocks (231 and 233) are used to create a new version (213) of the file. Blocks (221 and 223) may or may not be changed (e.g., blocks 221 and 223 may be erased or marked for deletion or left unchanged) and the previous version of the file system metadata (211) is not changed. Thus, a previous version of the file is maintained during the modification of the file create a new version.

In one embodiment, the user blocks are also tagged with transaction IDs (e.g., 225, 227, 235, 237).

In one embodiment, different versions of the file system metadata files may point to the same user data block if the block is not modified. For example, in FIG. 4, the user data block (221) is not modified. Thus, the metadata versions (211 and 213) point to the same block. Such an approach reduces the amount of data to be copied to make a new version of a file and reduces the amount of storage space used for maintaining multiple versions of user data.

In one embodiment of the present invention, at least one consistent user data is stored in the file system. Older versions of the user data can be eliminated automatically in a background process when the new versions of the user data are secured on the non-volatile memory.

In one embodiment of the present invention, files in the file system are individually versioned. Different files can have different policies for maintaining different numbers of versions and for different periods of time.

Figure 5:
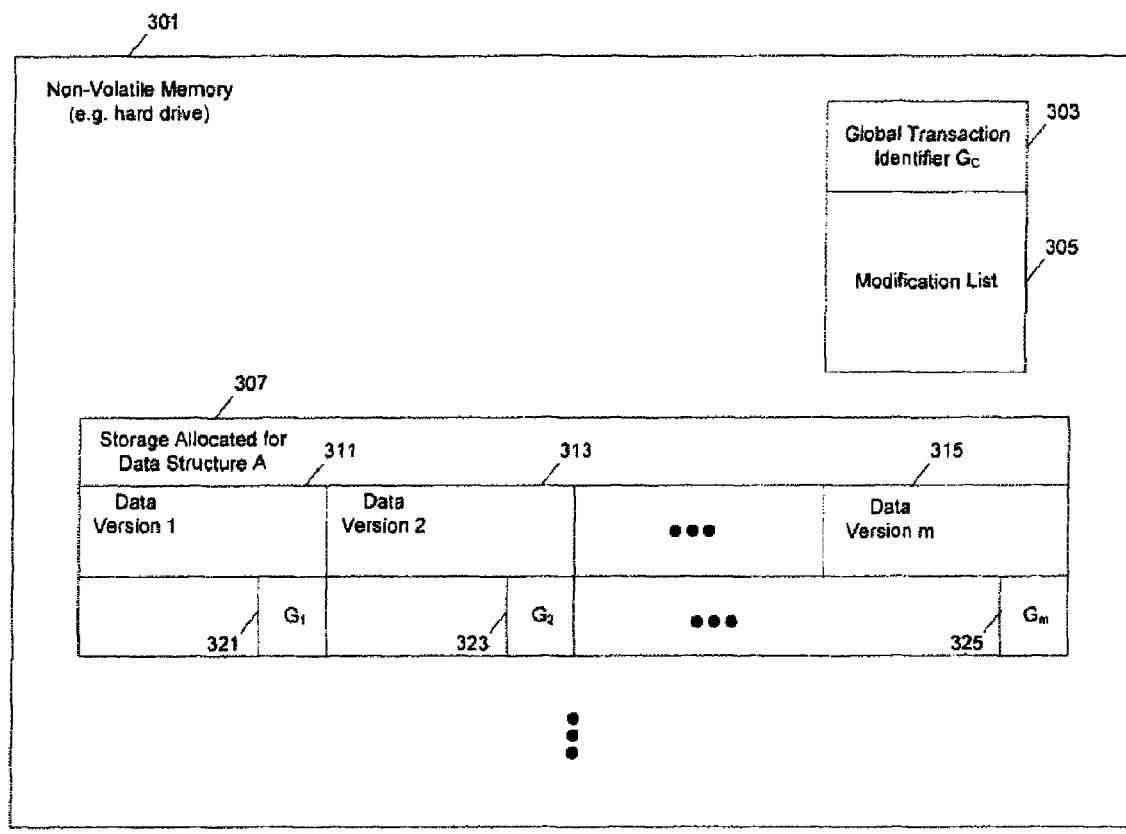
FIG. 5 illustrates an example of crash recovery according to one embodiment of the present invention.

FIG. 5 illustrates an example of crash recovery according to one embodiment of the present invention. In one embodiment of the present invention, a pessimistic view of the possibility of crashing leads to an approach of identifying invalid versions actively. A modification list (305) is used to indicate the list of data structures to be modified. It is not necessary to keep details about the modifications. The list of data structures to be modified allows a recovery process to quickly check the list of data structures for invalid versions, instead of searching the entire non-volatile memory (301) for invalid versions. Since the search for the invalid versions are limited to the list of data structures maintained on the modification list (305), the recovery process can be completed quickly.

For example, before a modification is made to the data structure (307), a reference to the data structure (307) is atomically added to the modification list (305) (by writing the list to the storage medium and then causing the storage medium to flush its caches/buffers). The flushing of these caches/buffers assures the system that the modification list has been stored on the storage medium (or not store in its entirety, in which case the process can be repeated with the writing of the modification list and the flushing of the modification list). When the modification list (305) is secured on the non-volatile memory (301), modifications to data structure (307) can be atomically made to complete a write transaction.

If a crash occurs before the next checkpoint, the recovery process can read the modification list (305) to search in the list of data structures for invalid versions. For example, since a reference to the data structure (307) is on the list, the transaction identifiers (e.g., 321, 323, ..., 325) of the corresponding versions (311, 313, ..., 315) of the data structure are compared to the global transaction identifier (303). Any version that is later than the check point marked by the global transaction identifier (303) is an inconsistent version and can be invalidated. For example, the inconsistent version can be tagged with a specially designated transaction ID or other numbers to indicate that the corresponding version is invalid or the version can be erased.

Once the transactions are completed and the data are secured on the non-volatile memory (301), an atomic update of the global transaction identifier (303) can be performed to mark the next checkpoint. After the global transaction identifier (303) is updated, the old modification list can be cleared and replaced with a new modification list.

In FIG. 5, the data structures that may have invalid versions are listed in the modification list (305). Thus, searching the modification list (305) for invalid versions is sufficient to eliminate invalid versions from the non-volatile memory (301).

Figure 6:
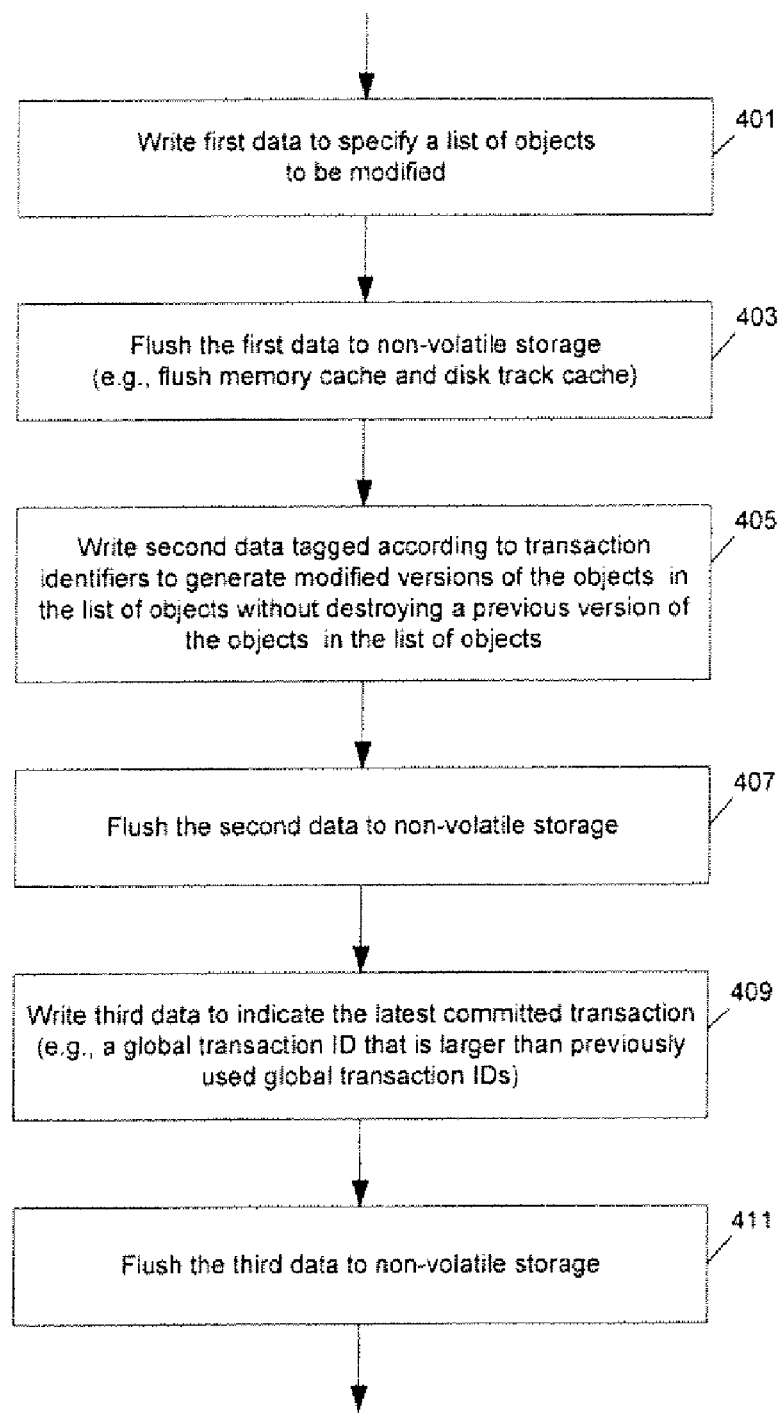
FIG. 6 shows a method to update data structures for crash recovery according to one embodiment of the present invention.

FIG. 6 shows a method to update data structures for crash recovery according to one embodiment of the present invention. After operation 401 writes first data to specify a list of objects to be modified (e.g., modification list 305), operation 403 flushes the first data in any cache into the non-volatile storage (e.g., flush memory cache and disk track cache). This flushing operation will make the writing operation 401 an atomic operation because the flushing ensures that operation 401 either completely happens or doesn't completely happen. In other words, the flushing operation (which is often accomplished with an additional command (e.g., "sync" command) after the write command to the hard drive) ensures that the write is either completely successful or not completely successful because the hard drive is forced to actually perform the writing of any data in the buffer which is being flushed. Thus, if a crash occurs, the first data can be used to restrict the search area for invalid versions to the list of objects to be modified. After operation 405 writes second data tagged according to transaction identifiers to generate modified versions of the objects in the list without destroying a previous version of the list of objects, operation 407 flushes the second data to the non-volatile storage. When the modified versions are flushed to the non-volatile storage, a consistent point is reached. Operation 409 writes third data to indicate the latest committed transaction (e.g., a global transaction ID that is larger than previously used transaction IDs). After operation 409, operation 411 flushes the third data to the non-volatile storage. When the third data is secured on a non-volatile storage device, the transaction is completed. If a crash occurs before the completion of operation 411, a recovery process can be used to remove the invalid versions. Operations 401-411 are typically repeated to process transactions in a way that supports quick crash recovery.

Figure 7:
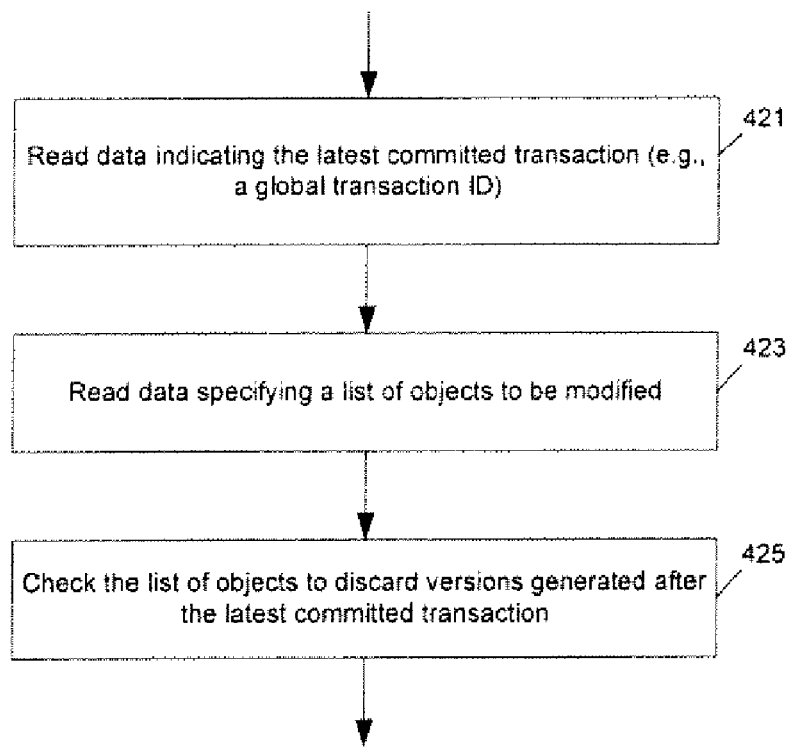
FIG. 7 shows a method to recover from a crash according to one embodiment of the present invention.

FIG. 7 shows a method to recover from a crash according to one embodiment of the present invention. After a crash, operation 421 reads data indicating the latest committed transaction (e.g., a global transaction ID that was previously atomically recorded). Operation 423 reads data specifying a list of objects to be modified. Operation 425 checks the list of objects to discard versions generated after the latest committed transaction. After invalid versions are discarded or marked to be discarded in future write operations, normal write operations can be performed on the storage device to create new versions of data. It is understood that read operations can be performed before operation 245 is complete. When a data structure is accessed for a read operation, a version written no later than to the latest committed transaction is used.

Figure 8:
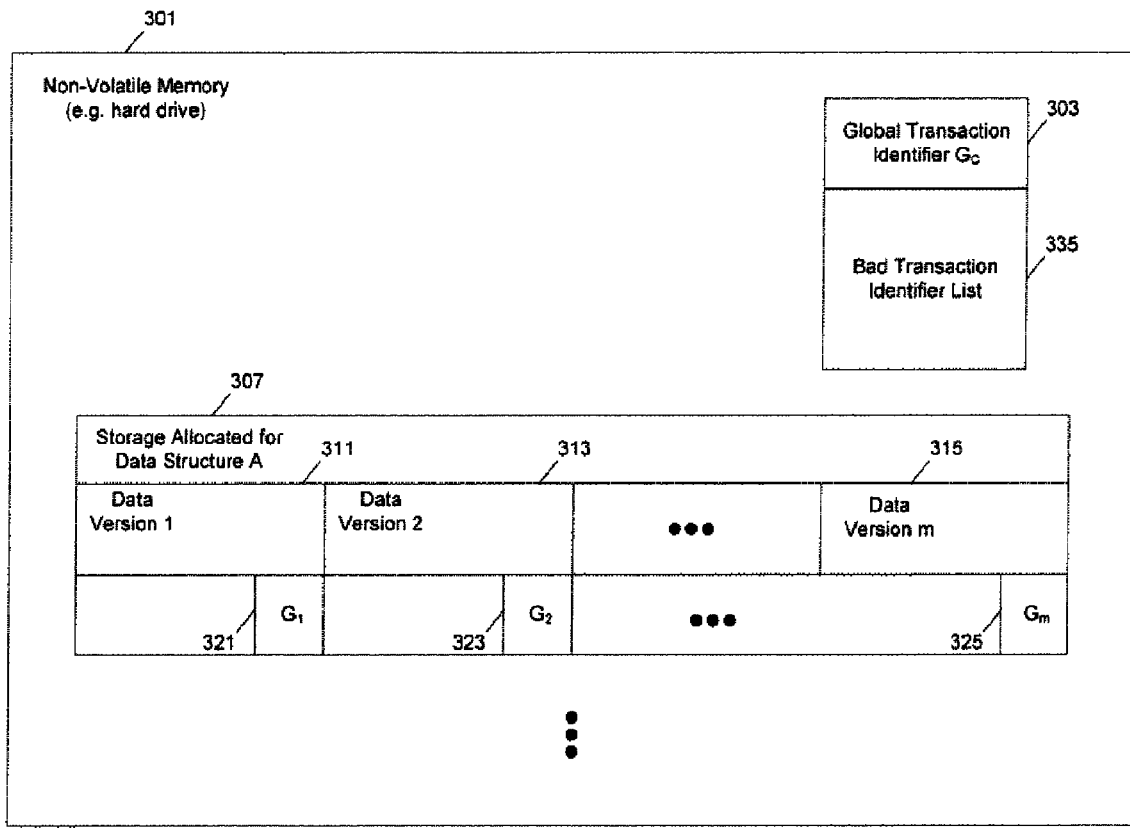
FIG. 8 illustrates another example of crash recovery according to one embodiment of the present invention.

FIG. 8 illustrates another example of crash recovery according to one embodiment of the present invention. In one embodiment of the present invention, an optimistic view of the possibility of crashing leads to an approach of deferred cleaning of invalid versions. A bad transaction identifier list (335) is used to maintain a list of invalid transaction identifiers.

For example, transaction IDs issued for typical write transactions are valid transaction IDs. When a data structure is accessed, the transaction IDs for the different versions of the data structure are checked against the bad transaction identifier list to determine if the corresponding versions are valid. Typically, the latest valid version is used. If an invalid version is found, the space for the invalid version can be reused in a subsequent write operation to create a new version. A specially designated transaction ID (or the largest possible transaction ID) can be used to tag the invalid version.

If a crash occurs between two checkpoints, the new versions created between the two checkpoints are invalid. A recovery process can determine a range of transaction IDs that are invalid. Typically, a system allows a predetermined maximum number of transactions between two checkpoints. Thus, from the global transaction identifier (303), the maximum possible range of invalid transaction IDs can be determined. It is understood that the range of invalid transaction IDs does not have to be exact. It is sufficient that the determined range of invalid transaction IDs includes the actual invalid transaction IDs. Once the range of bad transaction IDs are secured in to the bad transaction identifier list (375), the global transaction identifier (303) can be updated (to have a value which is larger than the largest number in the range of invalid transaction IDs) to mark a new consistent point after the crash. New transactions can be then be performed. Since no search to eliminate the invalid versions is necessary to bring the system back to normal operations, the recovery process can be very quick.

If another crash occurs, the recovery process can further add information regarding bad transaction IDs to the bad transaction list (375).

In one embodiment, the bad transaction identifier list includes information specifying ranges of bad transaction IDs, such as a starting transaction ID with an increment, or the beginning and the end of a range of transaction IDs.

When a data structure (e.g., 307) is accessed, the transaction identifiers (e.g., 321, 323, ..., 325) of the corresponding versions (311, 313, ..., 315) of the data structure are compared to the bad transaction list (375) to determine the latest valid version. If a version of the data structure is invalid, the invalid version may be ignored or recycled or retagged. Thus, it is not necessary to scan and remove bad versions before resume normal use of the system.

In one embodiment of the present invention, a background process can be used to scan the bad versions. When the non-volatile memory (301) is free of bad versions, the bad transaction list can be modified accordingly.

Figure 9:
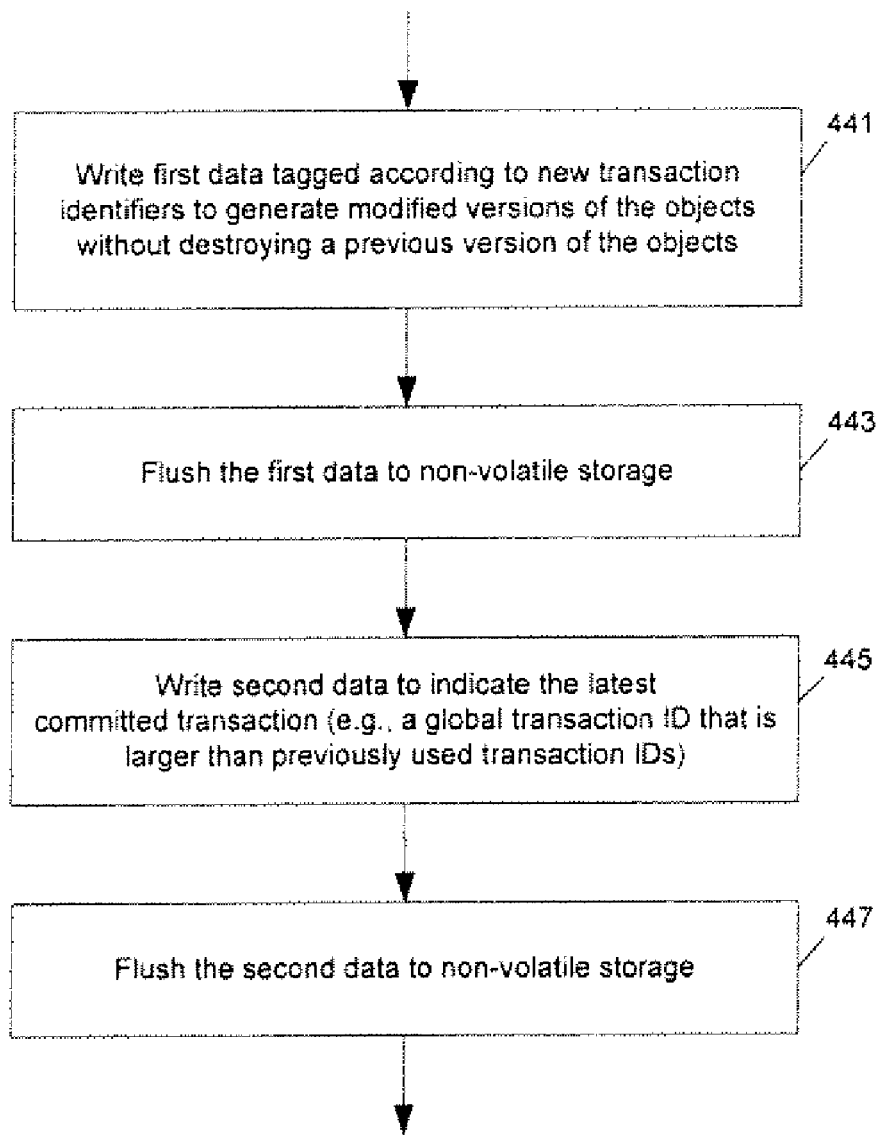
FIG. 9 shows another method to update data structures for crash recovery according to one embodiment of the present invention.

FIG. 9 shows another method to update data structures for crash recovery according to one embodiment of the present invention. The system obtains the next (new) transaction ID for a write transaction, which next (new) transaction ID will be used to tag the data which is to be written. Operation 441 writes first data tagged according to transaction identifiers to generate modified versions of the list of objects without destroying a previous version of the list of objects. Operation 443 flushes the first data to non-volatile storage. After operation 445 writes second data to indicate the latest committed transaction (e.g., a global transaction ID that is no smaller than previously used transaction IDs), operation 447 flushes the second data to non-volatile storage. Operations 441-447 are typically repeated to process transactions in a way that supports quick crash recovery.

Figure 10:
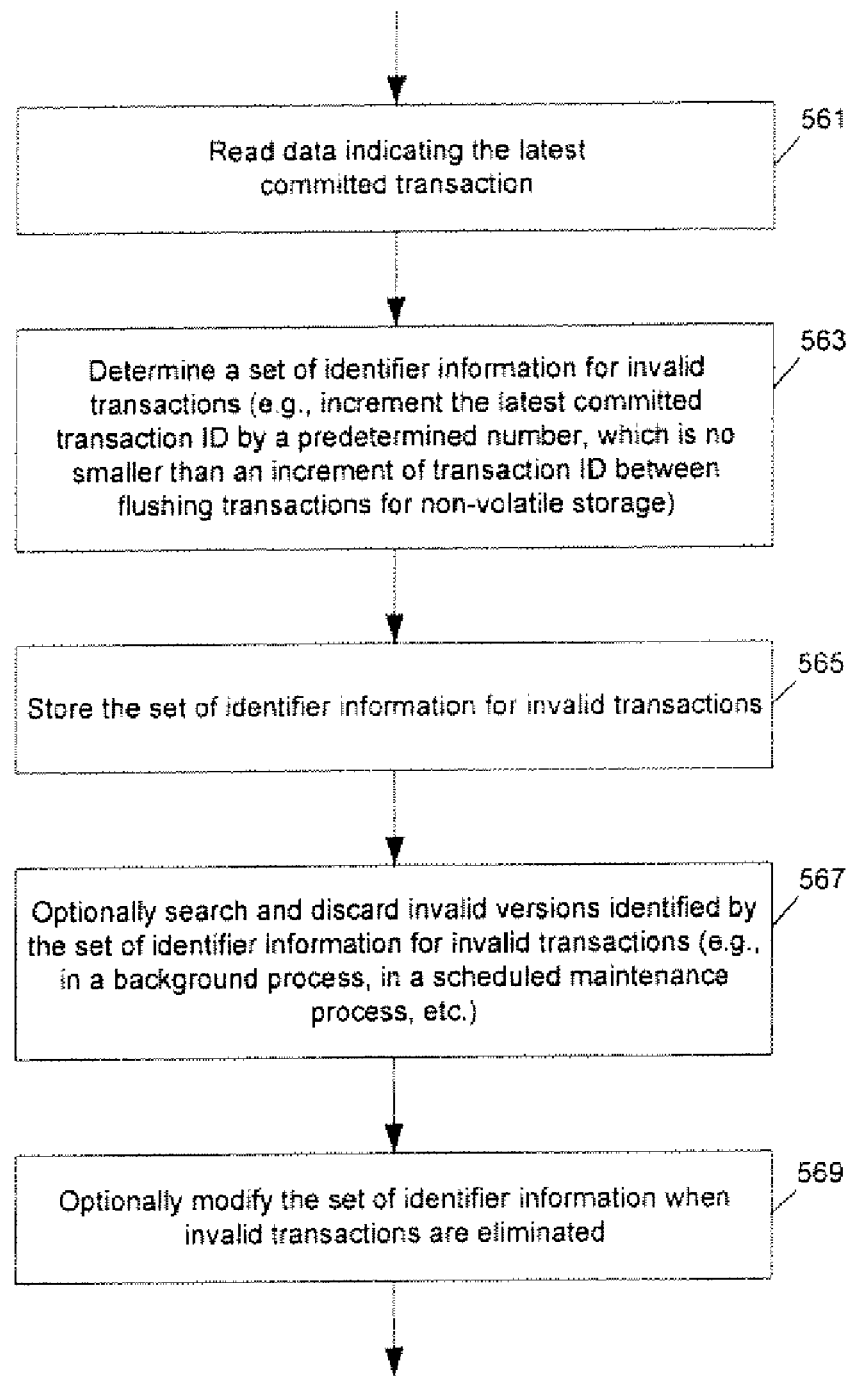
FIG. 10 shows another method to recover from a crash according to one embodiment of the present invention.

FIG. 10 shows another method to recover from a crash according to one embodiment of the present invention. After a crash, operation 561 reads data indicating the latest committed transaction (e.g., a global transaction ID that is no smaller than previously used transaction IDs). Operation 563 determines a set of identifier information for invalid transactions (e.g., increment the latest committed transaction ID by a predetermined number, which is no smaller than an increment of transaction ID between flushing transactions for non-volatile storage). Operation 565 stores the set of identifier information (e.g., a range of invalid transaction IDs) for invalid transactions. Since invalid versions according to the set of identifier information for invalid transactions are not used and can be overwritten when a new version is created, the data system can be returned to normal usage after the completion of operation 565. Optionally, operation 567 may search and discard invalid versions identified by the set of identifier information for invalid transactions (e.g., in a background process, in a scheduled maintenance process, etc.). Operation 569 optionally modifies the set of identifier information when invalid transactions are eliminated.

Figure 11:
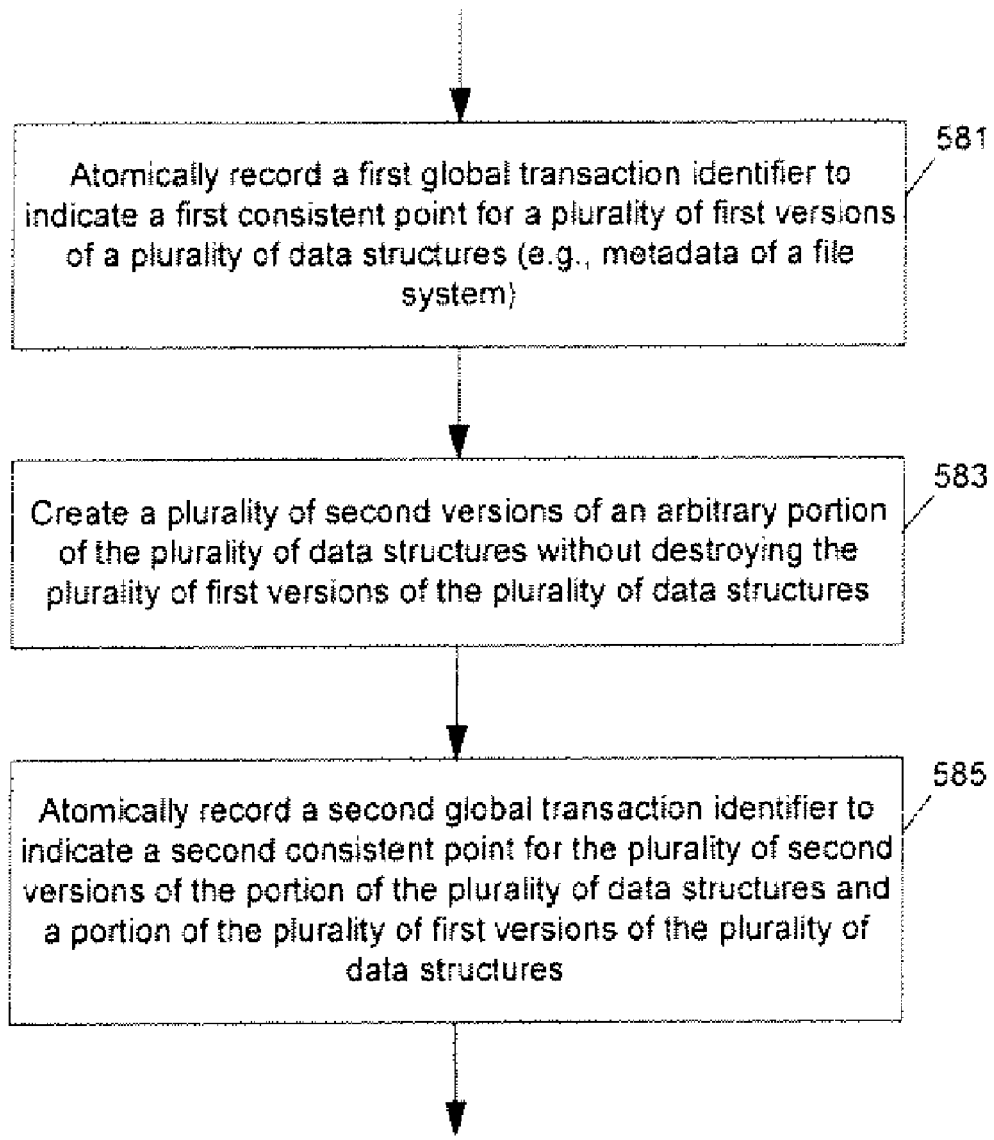
FIG. 11 shows a method to perform transactions according to one embodiment of the present invention.

FIG. 11 shows a method to perform transactions according to one embodiment of the present invention. Operation 581 atomically records a first global transaction identifier to indicate a first consistent point for a plurality of first versions of a plurality of data structures (e.g., metadata of a file system). Operation 583 creates (e.g., by atomic recording operations) a plurality of second versions of an arbitrary portion of the plurality of data structures without destroying the plurality of first versions of the plurality of data structures. Operation 585 atomically records a second global transaction identifier to indicate a second consistent point for the plurality of second versions of the portion of the plurality of data structures and a portion of the plurality of first versions of the plurality of data structures.

Figure 12:
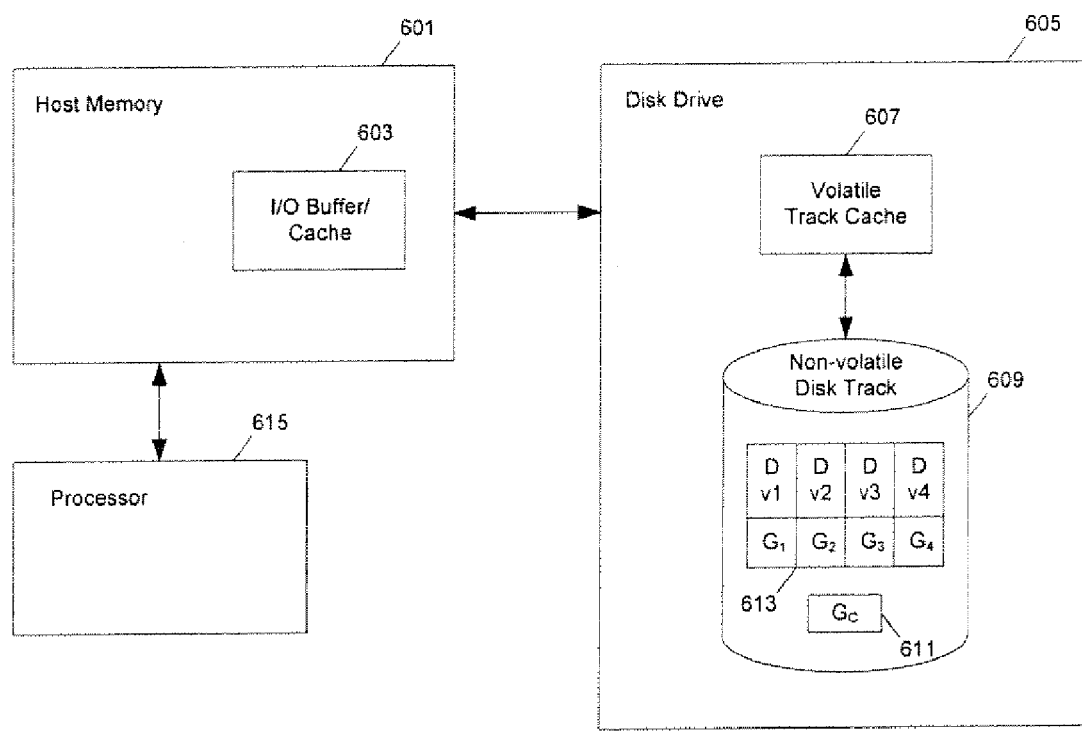
FIG. 12 shows a system to perform transactions according to one embodiment of the present invention.

FIG. 12 shows a system to perform transactions according to one embodiment of the present invention. In FIG. 12, a processor (615) may manage the data on the disk drive (605) using an I/O buffer/cache (603) in host memory (601). The disk drive (605) has a volatile track cache (607) to increase performance. For example, the disk drive (605) may cache the write requests in the track cache (607) for batch updates to the non-volatile disk track (609). Using the track cache (607), the disk drive (605) may write data out of order to optimize performance.

A track cache of a disk drive is typically volatile. When a crash occurs, the data in the track cache is typically lost. After the buffer and cache (e.g., 603 and 607) are flushed, the data is finally recorded in the non-volatile disk track, which is typically accessible after a system crash, although a media failure may cause the loss of the data stored in the non-volatile disk track. Data redundancy is a typically approach used to protect data against media failures.

Note that FIG. 12 illustrates a system compatible with a typical disk drive available today. However, there are alternatives to the system depicted in FIG. 12, since the disk drive may use different means to guarantee the recording of the data onto permanent storage. For example, some disk drives may support a force-unit-access option when writing data to force recording the data to permanent storage. Thus, in general, the software according to one embodiment of the present invention may send additional and/or special commands to the disk drive to force the disk drive to write the data into the permanent storage.

In one embodiment of the present invention, the global transaction identifier is atomically updated on the non-volatile disk track (609) to mark a consistent point and indicate a set of consistent versions of data structures. An atomic update of the global transaction identifier is performed after data for pending transactions are flushed into the non-volatile disk track (609) and before any further modifications are made.

In one embodiment, a data structure (e.g., 613) maintains multiple versions that are tagged with different transaction IDs. A set of consistent versions is unchanged on the non-volatile disk track while modifications are made to create new versions. Thus, at least one consistent version of data is available on the non-volatile disk track if a crash occurs.

Thus, the system of FIG. 12 periodically flushes buffers and caches to make a set of consistent data versions and then atomically records the global transaction identifier (611) to mark the new consistent point.

In one embodiment, different versions of a data structure (e.g., 613) are located close to each other on the non-volatile disk track (609) to prevent fragmentation and improve access performance.

Figure 13:
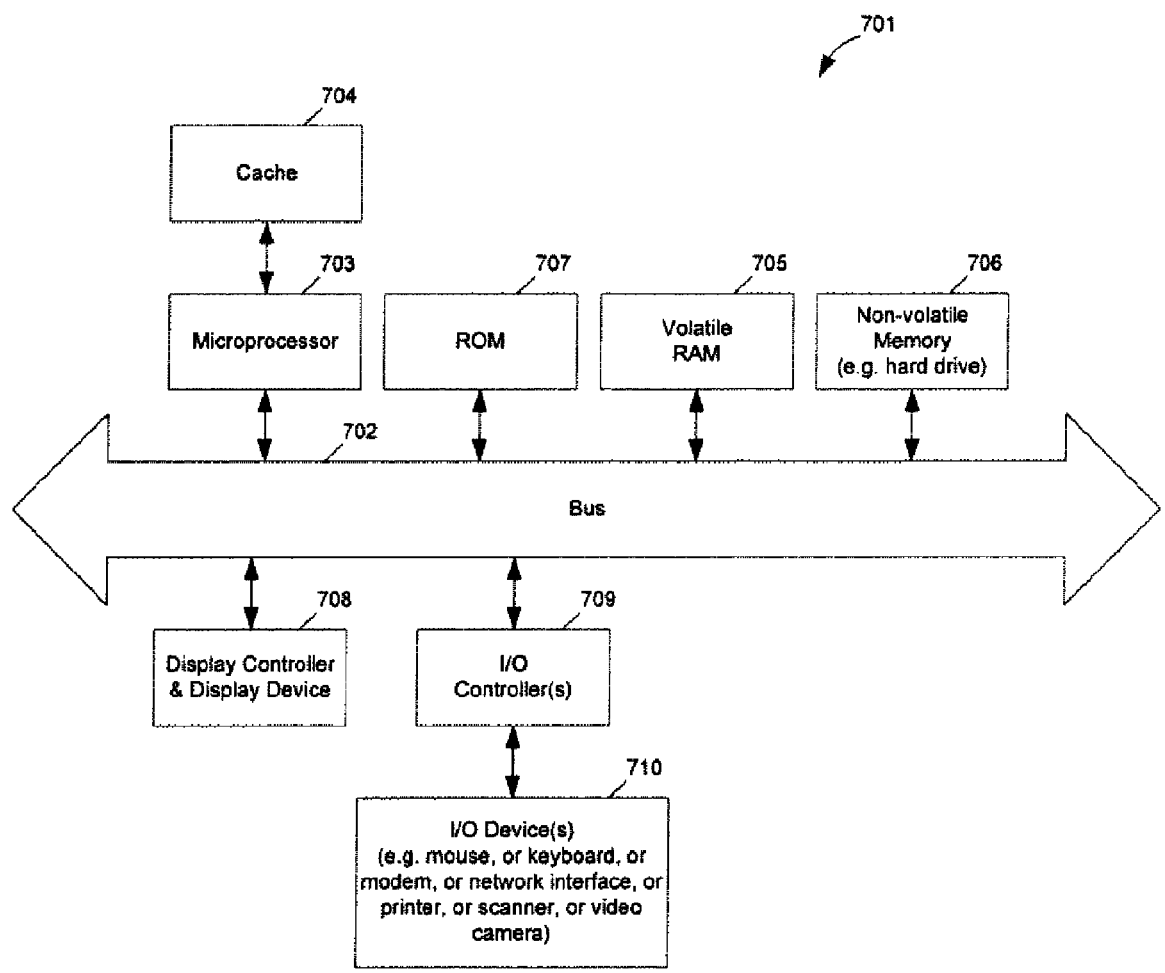
FIG. 13 shows a block diagram example of a data processing system which may be used with the present invention.

FIG. 13 shows one example of a typical computer system which may be used with the present invention. Note that while FIG. 13 illustrates various components of a computer system, it is not intended to represent any particular architecture or manner of interconnecting the components as such details are not germane to the present invention. It will also be appreciated that network computers and other data processing systems which have fewer or more components may also be used with the present invention. The computer system of FIG. 13 may, for example, be an Apple Macintosh computer.

As shown in FIG. 13, the computer system 701, which is a form of a data processing system, includes a bus 702 and system core logic 712 which interconnect a microprocessor 703, a ROM 707, and volatile RAM 705 and a non-volatile memory 706. The microprocessor 703, which may be, for example, a G3 or G4 or G5 microprocessor from Motorola, Inc. or IBM is coupled to cache memory 704 as shown in the example of FIG. 13. The bus 702 and system core logic 712 interconnect these various components together and also interconnects these components 703, 707, 705, and 706 to a display controller and display device 708 and to peripheral devices such as input/output (I/O) devices which may be mice, keyboards, modems, network interfaces, printers, scanners, video cameras and other devices which are well known in the art. Typically, the input/output devices 710 are coupled to the system through input, output controllers 709. The volatile RAM 705 is typically implemented as dynamic RAM (DRAM) which requires power continually in order to refresh or maintain the data in the memory. The non-volatile memory 706 is typically a magnetic hard drive, a magnetic optical drive, or an optical drive (e.g., a DVD RAM), or other type of memory system which maintains data even after power is removed from the system. Typically, the non-volatile memory will also be a random access memory although this is not required. While FIG. 13 shows that the non-volatile memory is a local device coupled directly to the rest of the components in the data processing system, it will be appreciated that the present invention may utilize a non-volatile memory which is remote from the system, such as a network storage device that is coupled to the data processing system through a network interface such as a modem or Ethernet interface. The bus 702 may include one or more buses connected to one another through various bridges, controllers and/or adapters as is well known in the art. In one embodiment the I/O controller 709 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 707, volatile RAM 705, non-volatile memory 706, cache 704 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 703.

A machine readable medium can be used to store software and data which when executed by a data processing system causes the system to perform various methods of the present invention. This executable software and data may be stored in various places including for example ROM 707, volatile RAM 705, non-volatile memory 706 and/or cache 704 as shown in FIG. 13. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
    allocating respective storage space for multiple versions of each of multiple items of data;
    making multiple data changes to said multiple items of data where more than one of said items of data is changed multiple times, wherein, changes made to a same item of data have respective transaction identifiers such that a previous change to said same item of data is recognizable as having been made earlier than a later change to said same item of data through analysis of the previous and later changes' respective transaction identifiers, and wherein, changes made to said same item of data are kept so as to create different kept versions of said same item of data, and wherein, storage space needed to keep all of said different kept versions exceeds storage space allocated for said same item of data's multiple versions, said method therefore further including writing a newest version of said same item of data over an oldest version of said same item of data;
    flushing said items of data from a cache to a non volatile storage;
    marking said flushing of said items of data as a consistent point of said multiple items of data including assigning a global transaction identifier to said items of data;
    making additional changes to some but not all of said items of data after said flushing and keeping versions thereof, wherein, said changes to some but not all of said items of data have associated transaction identifiers that are recognizable as being made after said assignment of said global transaction identifier, and, recording on a list respective transaction identifiers for said changes made to some but not all of said items of data in a list;
    experiencing a crash before a next global transaction identifier is assigned for said items of data; and,
    in response to said crash, referring to said list to remove said versions thereof so as to restore said set of data items to said consistent point such that said versions thereof are not recognized.

2. The method of claim 1 wherein a same transaction identifier exists on changes made to different items of data of said multiple items of data.

3. The method of claim 2 further comprising having a maximum limit on the number of transactions that correspond to a transaction identifier between consecutive markings of global transaction identifiers.

4. The method of claim 1 further comprising keeping versions of the same data item proximate to one another.

5. The method of claim 1 wherein said list is kept on a non volatile storage device.

6. The method of claim 1 further comprising, in response to said crash:
    calculating a range of invalid transaction identifiers from said global transaction identifier and a maximum number of transactions allowed after consistent point has been reached; and, comparing said range of invalid transaction identifiers against said list to identify said respective transaction identifiers.

7. A machine readable storage medium containing stored program code that when processed by a central processing unit of a computing system causes a method to be performed, said method comprising:
   allocating respective storage space for multiple versions of each of multiple items of data;
   making multiple data changes to said multiple items of data where more than one of said items of data is changed multiple times, wherein, changes made to a same item of data have respective transaction identifiers such that a previous change to said same item of data is recognizable as having been made earlier than a later change to said same item of data through analysis of the previous and later changes' respective transaction identifiers, and wherein, changes made to said same item of data are kept so as to create different kept versions of said same item of data, and wherein, storage space needed to keep all of said different kept versions exceeds storage space allocated for said same item of data's multiple versions, said method therefore further including writing a newest version of said same item of data over an oldest version of said same item of data;
   flushing said items of data from a cache to a non volatile storage;
   marking said flushing of said items of data as a consistent point of said multiple items of data including assigning a global transaction identifier to said items of data;
   making additional changes to some but not all of said items of data after said flushing and keeping versions thereof, wherein, said changes to some but not all of said items of data have associated transaction identifiers that are recognizable as being made after said assignment of said global transaction identifier, and, recording on a list respective transaction identifiers for said changes made to some but not all of said items of data in a list;
   experiencing a crash before a next global transaction identifier is assigned for said items of data; and,
   in response to said crash, referring to said list to remove said versions thereof so as to restore said set of data items to said consistent point such that said versions thereof are not recognized.

8. The machine readable storage medium of claim 7 wherein a same transaction identifier exists on changes made to different items of data of said multiple items of data.

9. The method of claim 8 further comprising having a maximum limit on the number of transactions that correspond to a transaction identifier between consecutive markings of global transaction identifiers.

10. The machine readable storage medium of claim 7 further comprising keeping versions of the same data item proximate to one another.

11. The machine readable storage medium of claim 7 wherein said list is kept on a non volatile storage device.

12. The machine readable storage medium of claim 7 further comprising, in response to said crash:
   calculating a range of invalid transaction identifiers from said global transaction identifier and a maximum number of transactions allowed after consistent point has been reached; and,
   comparing said range of invalid transaction identifiers against said list to identify said respective transaction identifiers.

13. A computing system having a storage medium and a central processing unit, said storage medium containing stored program code that when processed by said central processing unit causes a method to be performed, said method comprising:
   allocating respective storage space for multiple versions of each of multiple items of data;
   making multiple data changes to said multiple items of data where more than one of said items of data is changed multiple times, wherein, changes made to a same item of data have respective transaction identifiers such that a previous change to said same item of data is recognizable as having been made earlier than a later change to said same item of data through analysis of the previous and later changes' respective transaction identifiers, and wherein, changes made to said same item of data are kept so as to create different kept versions of said same item of data, and wherein, storage space needed to keep all of said different kept versions exceeds storage space allocated for said same item of data's multiple versions, said method therefore further including writing a newest version of said same item of data over an oldest version of said same item of data;
   flushing said items of data from a cache to a non volatile storage;
   marking said flushing of said items of data as a consistent point of said multiple items of data including assigning a global transaction identifier to said items of data;
   making additional changes to some but not all of said items of data after said flushing and keeping versions thereof, wherein, said changes to some but not all of said items of data have associated transaction identifiers that are recognizable as being made after said assignment of said global transaction identifier, and, recording on a list respective transaction identifiers for said changes made to some but not all of said items of data in a list;
   experiencing a crash before a next global transaction identifier is assigned for said items of data; and,
   in response to said crash, referring to said list to remove said versions thereof so as to restore said set of data items to said consistent point such that said versions thereof are not recognized.

14. The computing system of claim 13 wherein a same transaction identifier exists on changes made to different items of data of said multiple items of data.

15. The computing system of claim 14 further comprising having a maximum limit on the number of transactions that correspond to a transaction identifier between consecutive markings of global transaction identifiers.

16. The computing system of claim 13 further comprising keeping versions of the same data item proximate to one another.

17. The computing system of claim 13 wherein said list is kept on a non volatile storage device.

18. The computing system of claim 13 further comprising, in response to said crash:
   calculating a range of invalid transaction identifiers from said global transaction identifier and a maximum number of transactions allowed after consistent point has been reached; and,
   comparing said range of invalid transaction identifiers against said list to identify said respective transaction identifiers.

* * * * *